United States Patent [19]

Rapp

[11] Patent Number: 4,623,552

[45] Date of Patent: Nov. 18, 1986

[54] PUDDING COMPOSITION AND PROCESS FOR PREPARING PUDDINGS THEREFROM

[75] Inventor: Harold Rapp, Fairfield, Conn.

[73] Assignee: Nabisco Brands, Inc., Parsippany, N.J.

[21] Appl. No.: 746,366

[22] Filed: Jun. 19, 1985

[51] Int. Cl.$^4$ ............................................... A23L 1/04
[52] U.S. Cl. .................................... 426/575; 426/573; 426/579; 426/399; 426/413
[58] Field of Search ............... 426/575, 579, 573, 399, 426/413

[56] References Cited

U.S. PATENT DOCUMENTS 3,904,601 9/1975 Tessler ................................ 426/578
4,479,973 10/1984 Holley ................................ 426/578

Primary Examiner—Jeanette Hunter
Attorney, Agent, or Firm—Richard Kornutik

[57] ABSTRACT

A pudding composition particularly adapted to production of a sterile, aseptically packaged pudding product comprising an aqueous admixture of a sugar component, a starch component, a material selected from the group consisting of kappa-carrageenan, iota-carrageenan and mixtures thereof, and milk solids. In the preferred processing, the admixture is heated to elevated temperatures sufficient to sterilize the composition and effect cooking/solubilization of the starch, and then cooled to a temperature, preferably from about 70° F. to 110° F., suitable for aseptic filling and sealing in suitable containers. The final packaged pudding product of the invention exhibits stability against microbial contamination and changes in product characteristics, and possesses texture and organoleptic properties similar to (and often preferred to) those of homemade cooked-starch puddings.

8 Claims, No Drawings

PUDDING COMPOSITION AND PROCESS FOR PREPARING PUDDINGS THEREFROM

BACKGROUND OF THE INVENTION

This invention relates to pudding products and, more particularly, to compositions and methods for preparing room temperature shelf-stable aseptic pudding products.

As is well known in the art, starch-based, gelled or set pudding products are a most favored dessert item, whether consumed in pudding form as such or as the filling portion of a pie, tart or other like product.

Conventional pudding preparation by the consumer generally involves cooking (boiling) a mixture of starch, sugar and water or milk-based ingredients, together with flavorings, colorants or other additives peculiar to the particular pudding product. These ingredients can be individually obtained and used by the consumer or, as is often the case, some or all of the dry ingredients are available in packaged, dry pre-mixed form. During the cooking process, the starch granules undergo progressively increasing stages of water absorption, swelling and loss of birefringence, along with leaching out of the soluble portions of the starch. The aqueous mixture increases greatly in viscosity and, upon cooling, sets to a relatively firm gel structure having a characteristic smooth yet firm texture and non-gummy mouthfeel.

In order to meet increasing demands of consumer convenience, food manufacturers have sought to provide pudding compositions or products which involve a minimum of preparation time and effort. As noted earlier, one of the first efforts in this regard was the provision of a packaged pre-mix of pudding ingredients such as starch, sugar, colorants, flavorants and the like which required only that the consumer mix the package contents with milk or water and then proceed through the conventional cooking and cooling steps for preparation of a pudding.

Another effort in the provision of convenience puddings involved development of pudding compositions which did not require cooking in order to develop a gel-like texture. These "instant" pudding products generally rely upon starch only as a thickening agent to simulate the texture of cooked starch puddings. Establishment of the desired gel-like texture typically is achieved through use of an independent gelation system based upon interaction of hydrated milk proteins and alkali metal (e.g., calcium) pyrophosphates, orthophosphates and the like. In such products, the consumer need only add cold or room temperature milk or water to the contents of a packaged pre-mix of starch thickener, sugar, gelatin agents, milk proteins (where water alone is the hydrating agent to be added), flavorants, colorants, and the like, mix the ingredients and refrigerate. More recently, cold water-gellable starches have been developed which yield gel-like puddings without need for an independent gelation system.

It has been recognized that perhaps the ultimate in convenience pudding products would be the provision of a pre-prepared pudding per se. A product of this type has the advantage of not requiring any consumer preparation and opens up new vistas of increased pudding consumption in terms of snack items, lunchbox items and the like. Additionally, at least in theory, pudding products of this type would be more nearly akin to traditional cooked puddings in terms of texture and mouthfeel than has been attained to date with instant puddings since their preparation by the manufacturer would involve cooking and other steps, albeit on a lrge scale, similar to those employed by the consumer making a homemade pudding.

As is equally apparent, however, provision of a complete consumer pudding product intended to be purchased and consumed some time after manufacturer preparation and packaging necessarily involves concerns with shelf-stability, both in terms of long-term stability against changes in product characteristics but also, of course, stability against microbial contamination. To some degree these concerns can be eliminated by providing the product in a frozen (to-be-thawed) or refrigerated form, but this in turn limits the convenience of the product and increases costs of the manufacturer's preparation, shipping and storage.

SUMMARY OF THE INVENTION

It is an object of the present invention to provide a packaged, pre-prepared pudding product which exhibits long-term stability against changes in product characteristics and microbial contamination, and which is closely similar in textural and eating characteristics to traditional, homemade cooked puddings.

Another object of the invention is to provide a composition especially adapted to preparation of a cooked, aseptically processed and packaged pudding product having the characteristics as above described.

Yet another object of the invention is to provide a process for preparing an aseptically processed and packaged cooked pudding product.

In attaining these and other objects which will become apparent from the description which follows, substantial investigation was made into the preparation of pudding products meeting the desired characteristics.

Essentially, the route to products of this nature involves preparing an admixture of pudding ingredients, heating the admixture to a temperature sufficient to sterilize it (i.e., to kill microorganisms and the endotoxins released by microorganisms upon killing) and then packaging the admixture in a suitable container or package under aseptic packaging conditions. The heating/sterilization generally mimics the cooking step involved in homemade starch-based puddings and, thus, conventional homemade pudding formulations and recipes are in principle susceptible to treatment in this manner and the resultant product would as a consequence be likely to closely resemble homemade cooked puddings in texture, taste and mouthfeel characteristics.

Unfortunately, however, expectations based upon theory and principle in this area fall far short of what has been found to occur in practice. The present invention is predicated upon identification of the reasons for and causes of the shortcomings of otherwise reasonable approaches to the desired product goal, as well as to the overcoming of these problems through fundamental composition and processing features.

One of the major goals of the invention is the provision of a sterile, aseptically processed and packaged cooked pudding in which reliance upon traditional container or package materials suitable for aseptic packaging, such as glass or metal, is eliminated. These materials are subject to breakage in the case of glass and, for metal, present problems in terms of non-hazardous opening mechanisms, overall product and package weight, and the like. The art has available to it a number of thermoplastic, generally heat-resistant materials from which suitable product containers may be formed which offer advantages of light weight and easy-opening mechanisms. However, use of plastic containers in the aseptic packaging of cooking puddings presents a significant problem to the manufacturer. Thus, the aseptic packaging of sterile puddings can involve heating of the pudding product to cooking and sterilization temperatures, of, for example, from about 270° F. to about 300° F. Cooling of the product to about 190° F. to about 200° F., for example, can be effected simply as a matter of course as the product moves through the manufacturing and packaging process. For non-plastic containers, product at this temperature can be filled directly into the containers and sealed and, indeed, product filled at this temperature closely simulates the cooking and subsequent "packaging" (i.e., spooning into dessert dishes or into pie or tart shells) employed by a consumer making a homemade pudding. When plastic containers are employed, however, filling and sealing the containers with product in the temperature range of 190° F. to 200° F. leads to a number of problems. For example, at these temperatures, excessive vacuum may form within the plastic container and cause paneling (distortion) of the container walls. Also, the containers, being excessively warmed by the filled product, can cause the heat seals used for sealing lids onto the containers to remain soft for too long a period of time, increasing the possibility of seal damage. Still further, filling with product at elevated temperature can lead to excessive condensation of moisture within the container.

According to one processing aspect of this invention, the filling of containers with cooked pudding is conducted at a product temperature in the range of from about 70° F. to about 110° F., which obviates the earlier-noted problems. Such practice, however, gives rise to an associated significant problem regarding product characteristics. Thus, with a conventional starch-based pudding composition, the product generally will begin formation of the desired gel-like structure as cooling proceeds through a temperature of about 130° F. In order to cool the previously heated/sterilized liquid pudding composition to the temperature range of 70° F. to 110° F. (without holding the product for excessively long periods of time while evaporative cooling to this range takes place, which could lead to less than ideal conditions of sterile processing) and in order to fill product undergoing or which has undergone gelation, it is necessary to employ some form of heat exchange medium and device, and generally a scraped-surface heat exchanger, to accommodate the relatively viscous nature of the mixture. The agitation associated with scraped-surface heat exhanger cooling down to the desired 70° C. to 110° F. range results in breakdown of the gel structure and/or interruption or interference with the gelation process. After overt cooling has ceased, the product generally will not recover its desirable texture and set state, becomes gummy and exhibits syneresis.

As discussed in further detail hereinafter, these problems have been overcome according to the present invention by formulating a pudding composition containing starch along with a material selected from the group consisting of kappa-carrageenan, iota-carrageenan and mixtures thereof. Employing this thickener/gelation system in a processing and packaging operation wherein cooling with agitation down to a temperature below 130° F. is utilized results in pudding products having excellent gelation and texture characteristics.

Another problem encountered as a consequence of the elevated temperatures required to sterilize the pudding composition prior to packaging is that there is an increased tendency of the formulation to "cook-on" the heating surfaces, leading to the undesirable presence of distinct cooked particles in the final product and interruption of the production process to effect cleaning and scraping of heating surfaces. It has been determined that the milk-solids-not-fat (MSNF) component of the milk employed in high quality pudding formulations (the use of fresh milk as the bulk of a pudding formula being desirable for attainment of best flavors and texture) has the greatest tendency to cook-on heating surfaces. According to the invention, dairy cream or dairy cream and water is used to replace a portion of the whole milk which otherwise might be used in the formulation in order to reduce the presence of MSNF. Importantly, the final pudding product retains the desired texture and flavor associated with use of whole milk, but has a significantly decreased tendency to cook-on heating surfaces.

Another factor contributing to the tendency of the pudding formulation to cook-on is the viscosity of the composition during heating. As starch thickens considerably with heat, a conventional formulation is quite viscous at the elevated sterilization/cooking temperatures employed herein and has increased tendency to stick to and burn onto heating surfaces. The earlier-noted thickener/gelation system comprised of starch and kappa- and/or iota-carrageenan reduces viscosity at elevated temperatures compared to starch alone because the hydrated carrageenan mixtures per se decrease in viscosity with increasing temperature. Thus, cook-on caused by the starch component is minimized.

Yet another problem encountered in preparing pudding products of the type to which this invention is directed is that the elevated temperatures required for cooking/sterilization (particularly temperatures above about 270° F.) can cause instability and precipitation of proteins from any milk ingredients, particularly if the pH of the pudding is sufficiently close to the isoelectric point (pH 4.7) of milk protein. Accordingly, another aspect of the present invention involves formulation such that the pH of the pudding composition during processing is sufficiently high as to insure milk protein stability while at the same time avoiding off-colors and off-flavors which can result from excessively high pH.

The most important and ultimate goal is to produce a final pudding product which has physical and organoleptic properties, including mouthfeel, taste, appearance, spoonability and the like, closely similar to those of traditional homemade puddings. The most significant advantagge of the present invention is that this criterion can be attained in conjunction with the formulation and process modifications required in order to produce a sterilized, shelf-stable, aseptically processed and packaged product.

According to the present invention, a composition is provided which is adapted to form a pudding product by heating and mixing of the composition followed by cooling to a temperature of less than about 130° F., the composition comprising an aqueous admixture of a sugar component, a thickening starch component, a material selected from the group consisting of kappa-carrageenan, iota-carrageenan and mixtures thereof, and milk solids e.g., (milk fats and milk proteins). The composition is particularly adapted to processing involving subjecting the composition to an elevated temperature in the range of from about 270° F. to about 300° F. followed by cooling of the heated composition, with agitation, to a temperature below about 130° F. and most preferably in the range of from about 70° F. to about 110° F. In conjunction with aseptic filling and sealing techniques using thermoplastic containers, the foregoing processing is particularly designed for production of sterile pudding products exhibiting long-term product and microbial stability under room temperature conditions.

Further preferred aspects of the composition include formulation of the composition to attain a pH in the range of from about 6.5 to about 6.8. Additionally, it is preferred that the milk protein and fat of the composition be obtained through use of a combination of dairy cream and whole milk.

The present invention also provides a process for producing sterile pudding products exhibiting stability as to physical, organoleptic and microbiological characteristics while closely simulating the desired organoleptic and textural characteristics of a homemade cooked, starch-based pudding, the process comprising preparation of a pudding composition comprising an aqueous admixture of a starch component, a sugar component, a material selected from the group consisting of kappa-carrageenan, iota-carrageenan and mixtures thereof, and milk solids, heating the composition to a temperature in the range of from about 270° F. to about 300° F. to cook and sterilize the admixture, cooling the sterilized composition with agitation to a temperature in the range of from about 70° F. to about 110° F., and filling and sealing the composition into suitable containers, preferably thermoplastic, under aseptic filling and sealing conditions. The process preferably makes use of scraped surface heat exchangers to effect the heating and cooling steps.

Finally, the present invention provides a final cooked pudding product prepared from the compositions and/or processes described above.

DISCUSSION OF BACKGROUND ART

As discussed at the outset, cooked starch-based puddings, mixes for making cooked, starch-based puddings and mixes for making instant "no cook" puddings are known.

A number of prior U.S. patents disclose gellable compositions based upon gums (hydrophilic colloids) or combinations of starch and gums, some of which compositions are characterized as puddings or having pudding-like consistency. For example, U.S. Pat. No. 2,801,924 relates to an instant pudding mix based upon alkali pyrophosphate/alkali orthophosphate milk coagulants and including a "stiffening agent" which can be starch or a starch derivative (e.g., pregelatinized starch), natural gum, cellulose derivative and the like, which act to increase the viscosity of aqueous systems. U.S. Pat. No. 2,865,762 mentions the use of setting agents such as Irish moss extract in instant puddings. U.S. Pat. No. 2,949,366 relates to an alginate-based, moldable, custard-like "milk pudding". In U.S. Pat. No. 3,332,785 mention is made of the use of cold-swellable starches in conjunction with alginates, gelatins or phosphates to prepare shape-retaining puddings. U.S. Pat. No. 3,443,990 relates to preparation of a cold-water-dispersible starch containing carboxymethyl cellulose or natural gum additives for use in, e.g., dry pudding compositions. In U.S. Pat. No. 3,582,350 an instantly-dispersible pregelatinized flour and starch composition is prepared in which dispersing agents such as gums or dextrins can be added prior to gelatinization and drying. U.S. Pat. No. 3,949,104 involves preparation of starches having inhibited thickening capacity using, e.g., additives such as hydrocolloids. In U.S. Pat. No. 3,955,009, a mix is provided for making an instant tangy pudding or yoghurt-like product. Modified or pregelatinized starches and hydrocolloid gums such as guar gum as used to obtain quick setting. In U.S. Pat. No. 4,006,262, a milk and phosphate-based instant pudding mix is disclosed in which starch, starch derivatives, natural gums and cellulose derivatives are disclosed as stiffening agents.

Carrageenans have been specifically disclosed in pudding compositions. U.S. Pat. No. 3,231,391 relates to a milk/phosphate-based instant pudding in which the preferred pregelatinized starch gel stiffening agent can be replaced by, e.g., hydrophilic colloids such as alginates and carrageenans. U.S. Pat. No. 3,619,208 relates to puddings, including cooked pudding mixes, containing particular amylaceous ingredients and which can further contain a thin boiling colloidal or cellulose gum system as provided for by including carrageenan, pectin, algin or a cellulose derivative and combinations thereof. U.S. Pat. No. 3,934,049 discloses milk/phosphate-based instant puddings in which a thickening agent can be selected from pregelatinized starch or gums such as acacia, agar agar, alginates, carob bean gum, carrageenin, ghatti gum, guar gum, sterculia gum, tragacanth, carboxymethyl cellulose and carboxyethyl cellulose. In U.S. Pat. No. 4,391,836, reference is made to agar, gelatin, corn starch, pectin, carrageenan, algin and combinations of locust bean gum and xanthan gum as gelling agents for puddings.

Reference to sterilized, canned pudding products can be found in U.S. Pat. Nos. 3,754,935 and 4,006,262, and certain aspects of aseptic packaging (of low pH foods) using plastic containers can be found in U.S. Pat. No. 4,152,464. Aseptic pudding products (plastic containers) currently sold in commerce include Hunt's Snack Pack ® (the ingredient statement for the chocolate version of which is: water, skim milk, sugar, partially hydrogenated soybean oil, modified food starch, cocoa, salt, sodium stearoyl lactylate, artificial flavors); Real-Fresh ® brand chocolate pudding (nonfat milk, sugar syrup, corn syrup, modified food starch, partially hydrogenated soybean and/or cottonseed oil, cocoa processed with alkali, water, salt, sodium stearoyl lactylate, artificial vanilla flavor); and Laura Secord chocolate pudding (Canada) (reconstituted skim milk, whey protein concentrate, liquid sugar, water, hydrogenated vegetable oil, modified starch, dextrose, cocoa, starch, caramel, salt, sodium stearoyl-2-lactylate, artificial flavor).

DETAILED DESCRIPTION OF THE INVENTION

According to particular aspects of the present invention, a pudding composition is prepared which comprises an aqueous admixture of a sugar component, a starch component, a material selected from the group consisting of kappa-carrageenan, iota-carrageenan and mixtures thereof, and milk solids. The composition is formulated so as to have particular adaptability to a process for preparing a sterile, aseptically processed and packaged pudding product as hereinafter described in more detail, but is not limited in its utility to any particular processing mode.

In the composition of the invention, the starch component can be any modified or unmodified food starch capable of undergoing progressive increasing stages of water absorption, swelling and loss of birefringence when heated in an aqueous medium, accompanied by leaching out of its soluble portions. The starch confers thickening and gelling characteristics to the pudding composition as the composition is cooled and contributes to the final gel-like yet smooth texture of the ultimate pudding product consumed at room temperature or after refrigeration. Suitable starches include corn starch, waxy maize starch, tapioca starch, potato starch and the like, and the modified derivatives thereof such as etherified, esterified, acid-treated and other like starches.

In the preferred embodiment of the invention, the starch component is selected so as to exhibit resistance to shear thinning as the pudding begins to take on its gel-like structure contributed by the starch. Thus, in the preferred process embodiment of the invention, where the pudding composition is sterilized and cooked at elevated temperatures and then cooled with agitation to a package filling temperature of less than 130° F., and most preferably to a temperature in the range of 70° F. to 110° F., the starch is chosen such that the gel structure, which for most starches begins to form at about 130° F., exhibits some degree of resistance to permanent destruction or alteration as a consequence of the shear introduced by the agitation. A particularly preferred starch for this purpose is a cross-linked waxy maize starch.

The disruption of the starch gel under shear at temperatures below the gel point of the starch cannot entirely be eliminated by choice of a particular starch, however, and the resultant pudding product does not completely recover the desired texture and gel-like character attributable to the starch. For this and other reasons, the composition of the invention further contains either kappa-carrageenan or iota-carrageenan or a combination thereof. These seaweed-derived hydrocolloids are capable of forming gels in milk. In the present invention, these materials provide gel characteristics to the ultimate cooled pudding product of the invention which, in conjunction with the starch component, results in a texture closely similar to that obtained in homemade cooked starch puddings. In particular, use of these carrageenans compensate for the loss or alteration of the starch-gelling characteristics brought about by agitation and cooling at or below the starch gel point in the composition. The effect of these materials appears to be a combination of their own gelation properties, their conferring of a degree of shear resistance to the starch in the composition and their conferring of a degree of gel recovery or healing to the starch component in the composition.

The carrageenans need only be employed in relatively small amounts in the pudding composition in order to be effective for this purpose and, indeed, excessive quantities thereof can lead to an undesirable custard-like rather than cooked starch, pudding-like texture. Kappa-carrageenan alone tends to form a stiff brittle gel in milk and iota-carrageenan alone tends to form an elastic gel in milk. Their use according to the present invention, in conjunction with the starch component, provides the desired firm yet smooth texture in the final pudding product. Generally, kappa-carrageenan will be present in all formulations and, in most cases, will be employed in combination with iota-carrageenan. However, each particular pudding formulation, depending upon the starch employed, flavor additives, the texture sought, and the like, may dictate that either or both of the carrageenans be employed.

According to another aspect of the present invention, the tendency of the pudding composition or ingredients therein to cook on to heating surfaces, particularly at the elevated temperatures (e.g., above 270° F.) required to effect sterilization, is minimized as a consequence of formulation modifications. The aforementioned use of kappa- and/or iota-carrageenans contributes to this minimized burn-on tendency by decreasing the high temperature viscosity of the composition (as compared to a formulation containing starch alone). Another formulation modification relates to the milk-based ingredients.

The bulk of the pudding composition according to the invention is an aqueous milk component, which may comprise whole milk, dried milk solids, milk fats, milk proteins, separately reconstituted versions of the foregoing solids, fats and proteins, or simply combinations of water and any of the foregoing ingredients as separate additions to the overall pudding formulation. It has been determined that the milk-solids-not-fat component of whole milk is the material which is most prone to cook-on at the temperatures contemplated, and can lead to the presence of discernible undissolved particles in the final pudding product. In the preferred embodiments of the invention, a portion, generally up to about 20% by weight, of the whole milk which desirably would be used as the aqueous milk ingredient is replaced by dairy cream and water. This replacement reduces the level of MSNF in the overall formulation, and hence reduces burn-on tendencies, but does not detract from the desirable texture and flavor contribution associated with whole milk. According to the invention, therefore, the pudding composition preferably will contain whole milk and dairy cream, with additional water being added to attain the consistency and solids level which would be obtained if whole milk alone were used. The whole milk employed generally will have a fat content of about 3 to 4% by weight, and the cream generally will have a fat content of from about 35 to 40% by weight.

The milk proteins associated with the milk ingredients of the pudding formulation have a tendency to become unstable and precipitate, particularly at the high processing temperatures required to effect sterilization of the pudding composition. Destabilization becomes more likely to occur as the isoelectric point of the protein (pH 4.7) is approached. According to the invention, the pudding composition is formulated so as to have a pH in the range of from about 6.5 to about 7.0. The lower limit of this range is chosen to be sufficiently above the isoelectric point of milk protein to substantially insure that protein destabilization/precipitation will not occur in the temperature environs encountered during processing. The upper limit on this pH range is essentially a function of that pH at which off-colors and/or off-flavors might occur. A preferred pH range is from about 6.6 to 6.8. Most of the pudding formulations according to the invention will tend to have an unadjusted pH below the desired range, and any suitable food-grade alkali may be employed to raise the pH to the desired level.

The sugar component employed in formulation of the pudding composition of the present invention is chosen to provide a desired degree of sweetness and solids to the final pudding product. Granulated sucrose is the preferred sugar component, but other sweet mono-, di- or polysaccharides may be employed as all or a portion of the sugar component, such as dextrose, fructose, corn syrups or corn syrup solids, high fructose corn syrups and the like. Artificial sweeteners, non-nutritive sweeteners, low-calorie sweeteners and the like such as saccharin, dipeptide sweeteners (aspartame), Acesulfam K and others also may be employed as all or part of the sugar or sweetening component, and their use may, if desired, also be accompanied by use of suitable sweet or non-sweet bulking agents to provide desired solids levels.

The relative proportions of the various ingredients used to prepare the pudding compositions of the invention will be chosen to attain the various physical and functional characteristics and effects of, or attributable to, particular ingredients and/or their co-action. The composition is an aqueous admixture of ingredients, the aqueous nature of which is contributed either by water associated with particular ingredients and/or by overt addition of water.

Generally the starch will be present in an amount effective to provide thickening and gelation in the cooked, sterilized and cooled pudding product so as to result in a product having textural and eating characteristics similar to those of a homemade cooked pudding. Typically, the starch component will constitute from about 3% to about 10% by weight of the total pudding formulation, and most preferably from about 3.5% to about 5.0% by weight.

The sugar component of the composition, for provision of sweetness and solids to the product, generally will be present in an amount of from about 8% to about 20% by weight of the total composition. Flavorants or other additives peculiar to particular pudding products which may also contain a sugar, such as, for example, a butterscotch extract or topping, are considered as separate and apart from the ranges indicated for the sugar component per se, but obviously will have the effect of lowering the level of sugar component required to attain a particular desired overall sweetness.

As noted earlier, the kappa- and/or iota-carrageenan employed in the invention need be present only in relatively small quantities in order to attain the gelation, gel-healing and viscosity effects brought about thereby. Typically, the total carrageenan content of the pudding composition will be in the range of from about 0.05% to about 1.0% by weight, preferably from about 0.1% to about 0.5%, and most preferably from about 0.1% to about 0.3% by weight. The individual kappa- and iota-carrageenan, whether employed alone or in combination, will preferably be present in an amount of from about 0.05% to about 0.5% by weight of the total pudding composition, and most preferably from about 0.1% to about 0.35% by weight.

The bulk of the pudding composition of the invention will comprise aqueous materials which, as earlier noted, generally are in the form of whole milk, water-reconstituted milk ingredients or water per se, as well as combinations of these ingredients. Milk fat and milk protein solids preferably will be present in the composition, in whatever form supplied, so as to provide suitable texture and flavor in the final product. The milk components also can be used to provide cations which can enhance the gel-forming properties of the carrageenans.

It also is possible in accordance with the present invention to formulate the pudding composition so as to contain non-milk fats or oils, i.e., any unprocessed or processed (e.g., hydrogenation, fractionation, interesterification) vegetable or animal fat or oil or fraction thereof such as derived from, e.g., soybean oil, corn oil, coconut oil, cottonseed oil, peanut oil, safflower oil, palm kernel oil, sunflower oil, palm oil, rapeseed oil or the like. The non-milk fats can, if desired, be used as the sole fat component of the pudding composition (i.e., the milk solids of the invention consisting essentially of fat-free solids) or in conjunction with milk fats derived from a suitable milk component. In the preferred embodiments of the invention, however, the fat content of the pudding composition will be derived from a milk component (e.g., whole milk, cream).

The pudding composition of the invention is characterized herein as an aqueous admixture of ingredients and, alternatively, as an admixture of ingredients, one of which is water. This terminology is intended to embrace compositions where water is an overtly added ingredient, or where water is added in admixture with other ingredients or where water is intimately associated with other ingredients (e.g., as in the situation with milk or cream), or combinations of the above features.

In the preferred embodiment of the invention, whole milk is employed as the major source of water and milk solids and will be present in an amount of from about 50% to about 80% of the total composition, preferably from about 60% to about 70% by weight. Dairy cream also is employed in substitution for a portion of that amount of whole milk which might otherwise be required in order to reduce the content of milk-solids-not-fat, and hence decreased burn-on tendencies, of the overall formulation. Generally cream (30% to 40% fat content) in an amount of from 3% to about 10% by weight of the overall pudding composition will be employed. Water also will be overtly added in the preferred compositions to make up for lost aqueous medium as a result of substitution of concentrated cream for whole milk.

The pudding composition of the present invention preferably also will contain an emulsifier component which aids in dispersion and mixing of dry ingredients and contributes to the desired firm yet smooth texture. A preferred emulsifier component comprises sodium stearoyl-2-lactylate. Other suitable emulsifiers include, for example, mixtures of mono- and diglycerides prepared by direct esterification of edible fatty acids and glycerine. Typically the emulsifier component will be present in an amount of from about 0.01% to about 0.2% by weight of the total composition, and preferably from about 0.02 to about 0.08% by weight.

The pudding composition also will contain those flavorants and/or colorants and/or other additives used to produce particular puddings such as chocolate, vanilla and butterscotch puddings.

The pudding composition of the invention can be treated if desired in the known manner of producing cooked starch-based puddings involving heating the mixture with constant or periodic agitation to at or about its boiling point to effect starch solubilization, loss of birefringence, etc., and then cooling to effect setting or gelation to a gel-like pudding product. However, the formulation is particularly adapted to processing designed to produce a pudding having long-term stability against spoilage at room temperature conditions when packaged under aseptic conditions. To a large degree, commercial equipment and procedures associated with aspetic processing and packaging of low-acid foods such as those involved herein are governed in the United States by regulations of the Food and Drug Administration, 21 C.F.R. § 113.40 (g). In this form of processing, the various ingredients of the composition are admixed in a suitable vessel, either individually and/or in the form of pre-blends of certain ingredients, and then, in accordance with the invention, preferably homogenized to effect thorough and complete dispersion and intermixing. For the homogenization step, the mixture first preferably is heated to a temperature of from about 120° F. to about 160° F. and then passed through a suitable apparatus (e.g., a Manton-Gaulin homogenizer or a Cherry Burrell homogenizer) in either a single or multiple-stage at an appropriate homogenizing pressure. In preferred processing according to the invention, the total homogenizing pressure will be in the range of from about 500 psig. to about 4000 psig. and preferably is on the order of about 2500 psig. and 500 psig. Since the preparation of home-made puddings has no true counterpart to a homogenization step, the products made according to the present invention in this manner can often be characterized as having textural and organoleptic properties even more preferred than the home-made "standard".

The cooking/sterilization of the pudding composition typically will be conducted in scraped-surface heat exchange apparatus so as to best accommodate the increasing viscosity of the mixture during heating. Generally, the composition will be previously heated and homogenized at a temperature of, for example, about 140° F. and at this point typically will be formulated to have a (Bostwick) viscosity in the range of from about 20 to about 28. In the heat exchange apparatus, the composition will be heated to about 270° F. to about 300° F. and is then introduced into a suitable tubular "holding tube", to be held there at such temperature for the generally brief time required to effect sterilization. Thereafter, the sterilized composition is cooled to a temperature suitable for filling into containers and sealing under aseptic packaging conditions. Again, cooling also can be effected in a suitable scraped-surface heat exchanger. Where the product container is a plastic material to be sealed with an adhesively-applied foil lid, cooling to a product temperature of below about 130° F., and preferably to about 70° F. to about 110° F., is most desirable in order to avoid container deformation, condensation, faulty seals and other problems earlier discussed, the formulation of the pudding being such as to exhibit resistance to shear thinning and/or to exhibit gel rehabilitation when subjected to agitation at these low temperatures. Higher product filling temperatures can be employed where metal or glass containers are used as the product container, but even here the low temperatures discussed above can effectively be employed should condensation or other problems be encountered.

The ultimate gel and textural characteristics of the pudding will then be completed as the packaged product cools to room temperature.

The packaged pudding product is such as to be marketable either in room temperature or refrigerated form and consumable at either condition, and to closely simulate the texture and eating characteristics of a comparable homemade cooked-starch pudding. Most importantly, the pudding product exhibits long-term stability against changes in product characteristics and against microbial contamination.

The attainment of a texture and consistency of the pudding product similar to that possessed by a homemade cooked-starch pudding where the conditions of temperature and shear are drastically different than those employed in making a homemade pudding is a significant aspect of the present invention as brought about by formulation modifications and suitable selection of ingredients. The desired texture is a combined reflection of the firmness of the product (gel strength), its cohesiveness and its adhesiveness (stickiness). Gel strength must be above a predetermined level in order to have a pudding which is sufficiently firm to exhibit good cutting or spooning ability, but cannot be so high as to result in a rubbery texture. Cohesiveness is desirably sought to be maintained at a moderate level since excessively low cohesiveness leads to puddings of too loose or runny a texture and a too easy ability to fall or break apart, while excessively high values indicate rubber or overly firm texture. Adhesiveness is desirably sought to be minimized to reduce any perception of gumminess or lack of clean release from the eating utensil.

These parameters tend to be somewhat subjective and qualitative not so much in terms of varying with personal tastes or desires, but in terms of being difficult to quantitate with numbers per se. However, measurement devices such as a Leatherhead Food Research Associates (LFRA) textue analyzer, which utilizes controlled probe penetration and exit from a product and coupling to a chart recorder, are capable of providing force/resistance vs. time graphical representations in which peak amplitudes, shoulder configurations and the like can be generally correlated to gel strength, cohesiveness and adhesiveness as a means of confirming or supplementing purely observed parameters and for demonstrating differences among differing products.

The compositions, products and processes of the present invention are illustrated in the following examples.

EXAMPLE I

Vanilla puddings are prepared from the following ingredients, present at the weight percent levels (total composition weight) within the non-limiting ranges set forth; using Alpha-Laval processing equipment for pudding products:

Milk (3.3% fat): 63–68%
Sugar, granulated: 13–16%
Cream (36% fat): 7–8%
Water: 5.5–7%
Crosslinked waxy maize starch: 3.5–4.5%
Vanilla extract (2X): 0.25–0.30%
Salt: 0.15–0.25%
Kappa-carrageenan: 0.1–0.2%
Iota-carrageenan: 0.07–0.14%
Sodium stearoyl-2-lactylate: 0.03–0.05%
Color: trace The cream, about one-third of the milk and about one-half of the sugar are added to a 200 gallon agitated and steam-jacketed tank. The color and carrageenans are pre-blended with a small portion of the sugar and then added to the tank with high speed agitation. The remainder of the milk is added to the stirring contents of the tank, followed by addition of the remaining sugar, starch, salt, emulsifier and water. The steam is then turned on and the tank contents heated to about 140° F.

(10 inches Hg, vacuum). A dilute sodium hydroxide solution is then used to raise the pH of the mixture to 6.68, after which the vanilla flavor is added. The vessel contents are then homogenized in two stages of 2000 psig. and 500 psig., respectively. The homogenized mixture is then passed through a scraped-surface heat exchanger to attain a product temperature of about 280° F. The product is then admitted at this temperature into a one and three-eighths inch diameter holding tube of a length (646 inches) such that, at the product flow rate, a hold time of about 15 seconds is attained. The product exiting the hold tube is then cooled in a scraped-surface heat exchanger to a product temperature of about 100° F. and then aseptically packed into plastic (polypropylene laminate) containers and sealed with an adhesively-applied foil seal, employing a Conoffast aseptic packaging machine (Continental Can Company).

The firmness or gel strength of a product made according to this example was found to be acceptable but slightly high while cohesiveness was desirably moderate and stickiness or adhesiveness minimal.

EXAMPLE II

Chocolate puddings are prepared, generally in accordance with the processing set forth in Example I, from the following ingredients and non-limiting percentages of total composition:

Milk (3.3% fat): 56–63%
Sugar, granulated: 12–17%
Water: 10–14%
Crosslinked waxy maize: 3.5–4.5%
Cream (36% fat): 3.5–4.5%
Cocoa powder: 1.5–2.5%
Chocolate liquor: 1.5–2.0%
Salt: 0.20–0.30%
Vanilla extract (2X): 0.10–0.15%
Kappa-carrageenan: 0.10–0.15%
Iota-carrageenan: 0.09–0.11%
Sodium stearoyl-2-lactylate: trace The cream, about 4% of the milk and about one-half of the sugar are added to a 200-gallon stirred, steam-jacketed vessel. The carrageenans, a small portion of the cocoa powder and a small portion of the sugar are pre-blended and added to the tank with high-speed stirring, a portion of the remaining milk being used to thin out the mass as it thickens. Thereafter, the remaining milk is added to the vessel, followed by addition, in sequence, of the remaining sugar, cocoa powder, starch, salt, emulsifier and water. The batch is heated to 100° F. and the chocolate liquor added. Thereafter, the mass is heated to 140° F. and adjusted to pH 6.68, and all subsequent steps are then as in Example I.

Firmness, cohesiveness and adhesiveness for a product made according to this example all were found to be within desirable ranges.

EXAMPLE III

Butterscotch puddings are made, generally according to the processing set forth in Example I, from the following ingredients present in the non-limiting weight precentages shown, based upon total composition weight:

Milk: 63–68%
Butterscotch topping: 9–14%
Sugar, granulated: 7–10%
Cream (36% fat): 3–6%
Crosslinked waxy maize: 3.5–4.5%
Water: 2.5–5.0%
Kappa-carrageenan: 0.25–0.35%
Salt: 0.25–0.35%
Sodium stearoyl-2-lactylate: 0.03–0.05%
Butterscotch flavor: 0.03–0.05%
Colors: 0.02–0.04%
Calcium oxide: 0.015–0.025%

The cream, about one-third of the milk, and about three-fourths of the sugar are added to a stirred, steam-jacketed 200-gallon vessel. The carrageenan is pre-blended with the colors, flavor and the remaining portion of the sugar and added to the tank contents with high-speed agitation. In sequence, the starch, salt, emulsifier and water are then added to the tank. The calcium oxide and butterscotch topping are pre-blended and added to the tank, and the contents raised to 140° F. Following pH adjustment with dilute NaOH to 6.68, the subsequent steps are as in Example I.

Product made according to this example exhibited firmness, cohesiveness and adhesiveness within desired limits.

The pudding products according to the invention, apart from having a desirable combination of textural characteristics, also showed no evidence of cook-on or protein precipitation, and processed easily through production and packaging equipment. In comparison to the commercial products earlier referred to, the products made according to the foregoing examples were greatly superior in terms of texture and flavor, and in, particular, the commercial products were found to be quite adhesive and exhibit lack of firmness and cohesiveness. These results were confirmed by testing performed with an LFRA texture tester (normal mode; 10 mm penetration distance; 2 mm/second penetration and exit speed; one-inch AOAC probe; chart recorder speed of 5 cm/min. and 10 mv span). Products according to Examples I, II and III demonstrated acceptable firmness or gel strength, desirably moderate cohesiveness and minimal stickiness or adhesiveness. In comparison, using the same conditions, testing of the above competitive products resulted in a tailing off of the graphs during the probe return phase and a failure of the graph line to return to the zero-line (x-axis), indicating a residue of pudding sticking to the probe, associated with stickiness or adhesiveness.

What is claimed is:

1. A process for preparing a room-temperature sterile packaged pudding product having textural and organoleptic properties similar to those exhibited by a home-made cooked-starch pudding, and which exhibits long-term stability against microbial contamination, comprising the steps of:
   (a) preparing an aqueous admixture comprised of a sugar component, a starch component, milk solids, and a material selected from the group consisting of kappa-carrageenan and mixtures of kappa-carrageenan and iota-carrageenan in amounts effective to form a pudding;
   (b) heating said admixture to a temperature in the range of from about 270° F. to about 300° F. to effect starch solubilization therein and sterilization thereof;
   (c) cooling said sterilized admixture to a temperature below about 130° F. while agitating said admixture; and
   (d) packaging said cooled product under aseptic conditions in a suitable container composed of thermoplastic material.

2. The process according to claim 1 wherein said sterilized admixture is cooled to a temperature of from about 70° F. to about 110° F. before packaging thereof.

3. The process according to claim 1 wherein said aqueous admixture is homogenized prior to heating it to sterilization temperature.

4. The process according to claim 1 wherein the pH of said aqueous admixture is in the range of from about 6.5 to about 6.8.

5. The process according to claim 1 wherein said milk solids comprise, at least in part, dairy cream.

6. The process according to claim 1 wherein said milk solids comprise a combination comprising whole milk, dairy cream and water.

7. A process according to claim 1 wherein said aqueous admixture contains both kappa- and iota-carrageenan.

8. A packaged, sterile pudding product produced according to the process of claim 1.

* * * * *